(12) United States Patent
Sugimoto

(10) Patent No.: US 9,627,104 B2
(45) Date of Patent: Apr. 18, 2017

(54) HARNESS EXTERIOR PROTECTION MEMBER AND WIRE HARNESS USING THE SAME

(71) Applicant: YAZAKI CORPORATION, Tokyo (JP)

(72) Inventor: Masahisa Sugimoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/957,735

(22) Filed: Dec. 3, 2015

(65) Prior Publication Data

US 2016/0163422 A1    Jun. 9, 2016

(30) Foreign Application Priority Data

Dec. 4, 2014    (JP) .................................. 2014-245513

(51) Int. Cl.
| | | |
|---|---|---|
| *H01B 3/30* | (2006.01) | |
| *H01B 7/00* | (2006.01) | |
| *H02G 3/04* | (2006.01) | |
| *H01B 7/295* | (2006.01) | |
| *F16L 57/04* | (2006.01) | |
| *B60R 16/02* | (2006.01) | |

(52) U.S. Cl.
CPC ......... *H01B 7/295* (2013.01); *B60R 16/0215* (2013.01); *F16L 57/04* (2013.01); *H01B 3/305* (2013.01); *H02G 3/0468* (2013.01); *H02G 3/0481* (2013.01)

(58) Field of Classification Search
CPC ............. H02G 3/04; B60R 16/02; H01B 7/18
USPC ...................................................... 174/72 A
See application file for complete search history.

(56) References Cited

U.S. PATENT DOCUMENTS

| | | | | |
|---|---|---|---|---|
| 3,388,705 A | * | 6/1968 | Grosshandler .... | A61M 16/0463 128/207.14 |
| 3,908,704 A | * | 9/1975 | Clement .................... | A61F 2/06 128/204.18 |
| 8,291,943 B2 | * | 10/2012 | Walle ...................... | F01N 13/14 138/114 |

FOREIGN PATENT DOCUMENTS

| | | | |
|---|---|---|---|
| DE | 3210254 | * | 9/1983 |
| JP | 2013-017317 | * | 1/2013 |
| JP | 2014-12771 A | | 1/2014 |
| JP | 2014-75242 A | | 4/2014 |

OTHER PUBLICATIONS

Japanese Office Action for corresponding Application No. 2014-245513 issued Feb. 20, 2017.

* cited by examiner

*Primary Examiner* — Michael F McAllister
(74) *Attorney, Agent, or Firm* — Sughrue Mion, PLLC

(57) ABSTRACT

A harness exterior protection member with an electric wire bundle inserted therein includes a bent portion and a straight portion which are formed in a cylindrical shape in an integrated manner formed of a flame-retardant polyamide resin composition. A thickness of the straight portion is set to be twice to four times of a thickness of the bent portion. A bending radius of the bent portion is 10 mm or larger, and a bending strength of the straight portion is 15 to 25 N.

7 Claims, 3 Drawing Sheets

HARNESS EXTERIOR PROTECTION MEMBER AND WIRE HARNESS USING THE SAME

CROSS REFERENCE TO RELATED APPLICATIONS

This application claims the priority of Japanese Patent Application No. 2014-245513, filed on Dec. 4, 2014, the entire content of which are incorporated herein by reference.

BACKGROUND

Technical Field

The present invention relates to a harness exterior protection member, which is suitable for use as an exterior member of a wire harness for vehicle, for example, and a wire harness using the same.

Related Art

A wire harness to be routed along a vehicle body panel of a vehicle is bent in a vertical direction and a lateral direction at each point of a routing path, and is routed in a three-dimensional posture. FIG. 3 illustrates a part of an example of such a wire harness, which is conventionally known (refer to JP 2014-75242 A, JP 2014-12771 A), to be routed in the vehicle body panel.

As illustrated in FIG. 3, a wire harness W/H to be routed in the vehicle body panel is routed while allowing a corrugated tube 1 and a flexible tube or the like (not illustrated) to be bent at each a bending point of a routing path, and is routed via a hard tube 2, a protector 3, and the like at a straight point of the routing path. Further, the respective exterior members 1 to 3 are fixed to the wire harness W/H by a tape T.

SUMMARY

However, a wide variety of exterior different exterior members having different functions including the corrugated tube 1, the hard tube 2, the protector 3 and the like are used for the wire harness W/H in a routing structure of the conventional wire harness W/H, and thus, the number of parts of the exterior members is extremely a lot. In addition, there are points at which the exterior members overlap, and correspondingly, man-hours for mounting the parts increase, thereby increasing cost.

Thus, the present invention has been made in order to solve the above-described problem, and an object of the present invention is to provide a harness exterior protection member, which is capable of reducing the number of parts through aggregation of functions and achieving cost reduction by reducing man-hours taken for mounting work of an individual part, and a wire harness using the same.

A harness exterior protection member according to one aspect of the present invention is formed of a flame-retardant polyamide resin composition, the harness exterior protection member. The harness exterior protection member includes a bent portion configured to be a cylindrical shape and a straight portion that is formed to be integrated with the bent portion and configured to be a cylindrical shape. A thickness of the straight portion is set to be twice or more and four times or less of a thickness of the bent portion. A bending radius of the bent portion is 10 mm or larger. A bending strength of the straight portion is 15 N or more and 25 N or less.

The bent portion may be formed to have a thickness of 0.15 mm or more and 0.45 mm or less, and the straight portion may be formed to have a thickness of 0.45 mm or more and 1.20 mm or less.

A wire harness according to another aspect of the present invention includes a harness exterior protection member according to claim 1 or 2, and a plurality of linear conductors configured to be inserted into the harness exterior protection member.

The harness exterior protection member according to one aspect of the present invention and the wire harness using the same are capable of reducing the number of parts by integration and aggregation of functions by forming a bent portion and a straight portion in a cylindrical shape in an integrated manner, and acquiring cost reduction by reducing man-hours taken for mounting work. In addition, it is possible to significantly reduce an overlapping use of exterior members, and to provide the harness exterior protection member, which is suitable in use for a routing structure of the wire harness of a vehicle, and the wire harness with low cost.

DETAILED DESCRIPTION

Hereinafter, an embodiment of the present invention will be described with reference to the drawings.

Figure 1:
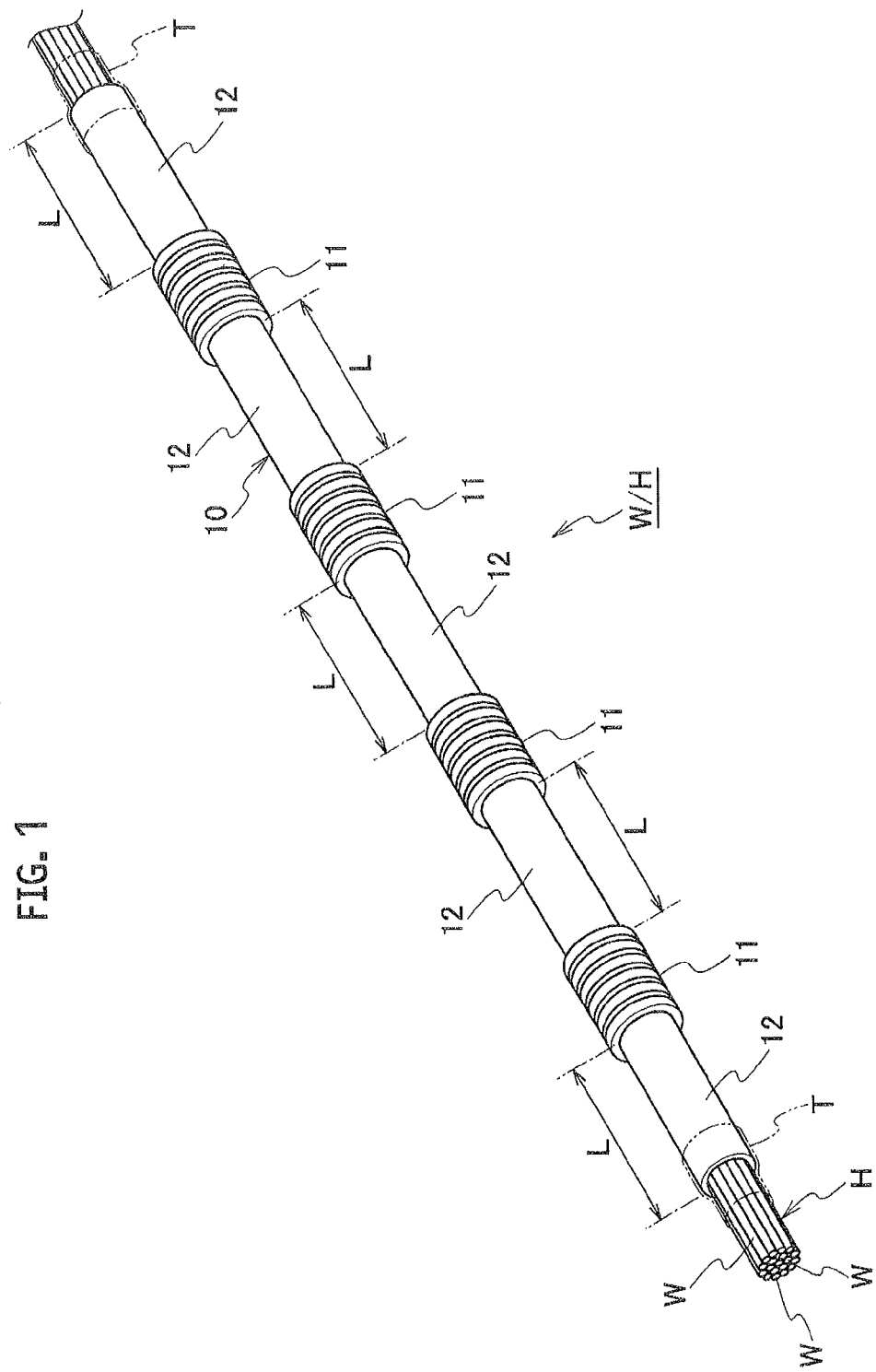
FIG. 1 is a perspective view illustrating a wire harness of an embodiment of the present invention.
Figure 2:
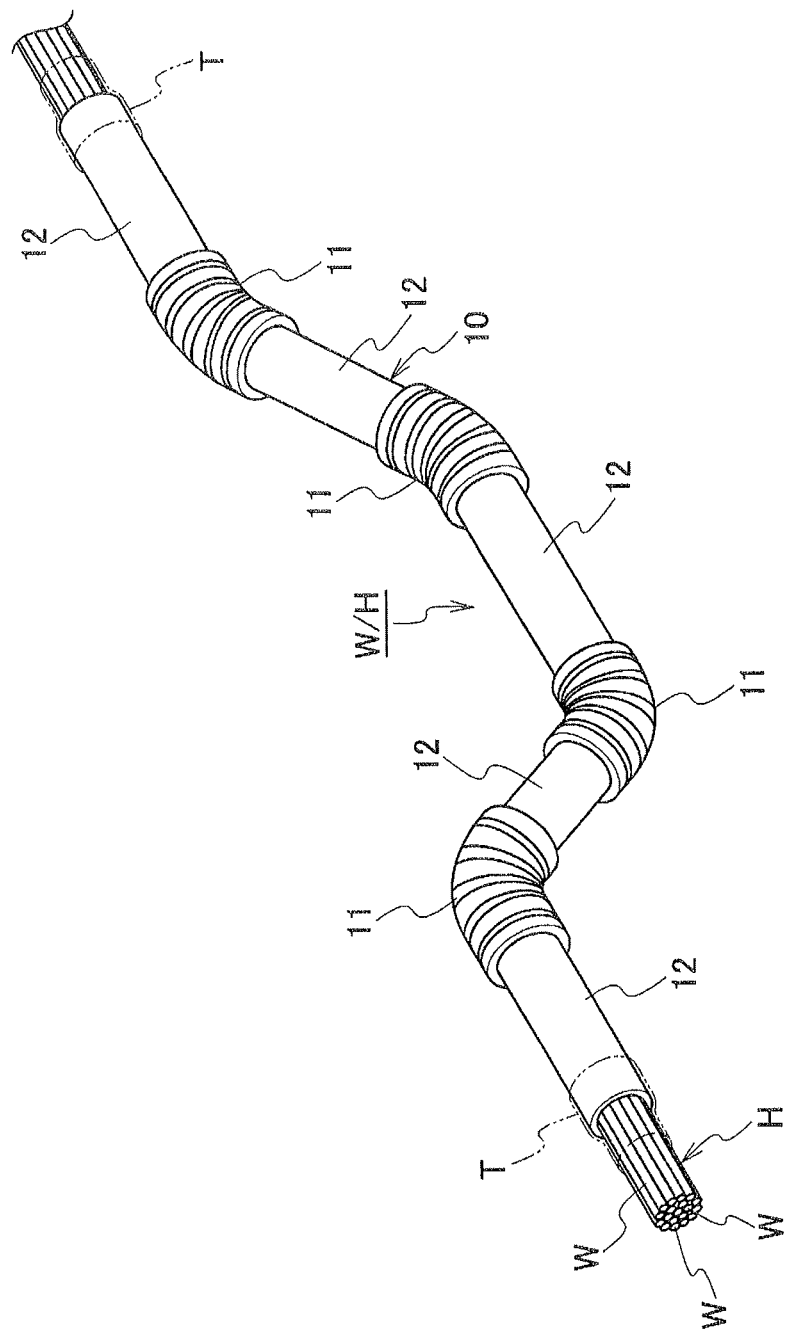
FIG. 2 is a perspective view illustrating a state of a three-dimensional posture in which the wire harness is bent in a predetermined direction.
Figure 3:
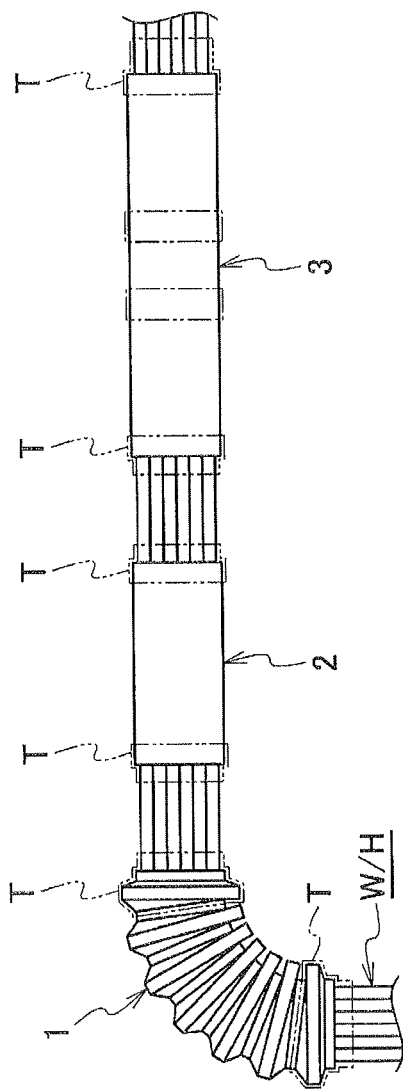
FIG. 3 is a side view illustrating a bent state of a conventional wire harness.

FIG. 1 is a perspective view illustrating a wire harness of the embodiment of the present invention, and FIG. 2 is a perspective view illustrating a state of a three-dimensional posture in which the wire harness is bent in a predetermined direction.

As illustrated in FIGS. 1 and 2, a wire harness W/H is provided with a bundle H of a plurality of linear electric wires (conductors) W, and a tube-like harness exterior protection member 10 made of a flame-retardant polyamide resin composition with the electric wire bundle H being inserted therein.

The harness exterior protection member 10 includes a bent portion 11 having a cylindrical bellows shape (corrugated shape) and a straight portion 12 having a cylindrical shape, which is formed in an integrated manner and formed of the flame-retardant polyamide resin composition. The bent portion 11 having the cylindrical bellows shape is arranged in plural so as to correspond to a bending point of a routing path of the wire harness W/H to be routed in a vehicle body panel (not illustrated) of a vehicle, and the straight portion 12 having the cylindrical shape is formed at each portion between the bent portions 11 and 11. Each length L of the straight portions 12 can be lengthened or shortened so as to correspond to a straight point of the routing path of the wire harness W/H while a length of the bent portion 11 is constant. In addition, although the harness exterior protection member 10 is cut into a predetermined length at time of extrusion molding of a resin molding machine (not illustrated), the entire length of the harness exterior protection member 10 can be changed so as to correspond to the routing path of the wire harness W/H.

In addition, the harness exterior protection member 10 is set such that a thickness (wall thickness) of the straight portion 12 is about twice to four times of a thickness (wall thickness) of the bent portion 11. To be specific, the harness exterior protection member 10 is formed such that the thickness of the bent portion 11 and the thickness of the straight portion 12 are in a range of 0.15 mm to 0.45 mm and a range of 0.45 mm to 1.20 mm, respectively. Such numerical values of the respective wall thickness have the similar tendency in a case in which tube diameters are different. In the case of a tube having a size of an inner diameter of 7 mm, it is preferable to form the harness exterior protection member 10 such that the thickness of the bent portion 11 is 0.27 mm, and the thickness of the straight portion 12 is 0.60 mm, in terms of evaluation of bending strength, flame retardance, die drool, short-term heat resistance, and an impact sensitivity to be described later.

Further, the flame-retardant polyamide resin composition, which is a tube material of the harness exterior protection member 10, contains 20 parts by weight of an elastomer, 20 parts by weight of a brominated flame retardant, 5 parts by weight of antimony trioxide, 3 parts by weight of a heat-aging-resistant agent and 2 parts by weight of an antioxidant agent with respect to 50 parts by weight of a thermoplastic polyamide resin as a base resin. Here, details of each material will be described in specific in Examples 1 to 3 and Comparative Examples 1 to 8 to be described later.

According to the wire harness W/H of the embodiment described above, the electric wire bundle H is inserted into the tube-like harness exterior protection member 10, and both end sides of the electric wire bundle H are fixed using the tape T as illustrated in FIG. 1. Next, each of the bent portions 11 is bent in a predetermined direction in a lateral direction or a vertical direction along undulation of the routing path of the wire harness W/H, thereby obtaining the routing in the three-dimensional posture as illustrated in FIG. 2.

In this manner, respective functions of exterior members including a corrugated tube 1, a hard tube 2, a protector 3, and the like of the related art are integrated and aggregated into the single harness exterior protection member 10, and accordingly, it is possible to significantly reduce the number of parts, and to achieve cost reduction by reducing man-hours taken for mounting work. In addition, it is possible to significantly reduce an overlapping use of the exterior members as in the related art, and thus, it is possible to provide the harness exterior protection member 10, which is most suitable to be adapted in a routing structure of the wire harness W/H of a vehicle, and the wire harness W/H with low cost. Further, it is possible to significantly reduce fixed points by tape winding, and thus, it is possible to achieve further reduction in cost.

EXAMPLE

Hereinafter, the present invention will be described more in detail with reference to examples and comparative examples, but the present invention is not limited to such examples.

(Sample Preparation for Examples and Comparative Examples)

(Preparation of Flame-Retardant Polyamide Resin Composition)

Each resin composition of Examples (1 to 3) and Comparative Examples (1 to 8) was prepared by melting and kneading materials in each blending amount (parts by weight) shown in Table 1 while using the polyamide resin as the base resin of the flame-retardant polyamide resin composition which is the tube material of the harness exterior protection member. Here, a product name "AMILAN CM1017", manufactured by Toray Industries, Inc., was used as polyamide 6 (PA6) as the polyamide resin in Table 1. A product name "AMILAN CM3006", manufactured by Toray Industries, Inc., was used as polyamide 6,6 (PA66) as the polyamide resin. A product name "DIAMIDE X7293", manufactured by Daicel-Evonik Ltd., was used as polyamide 12 (PA12) as the polyamide resin. A product name "E185GK", manufactured by Prime Polymer Co., Ltd., was used as the elastomer. A product name "FLAMECUT 121K", manufactured by Tosoh Corporation, was used as the brominated flame retardant. A product name "PAX-M", manufactured by NSK Ltd., was used as the antimony trioxide. A product name "CDA-10", manufactured by ADEKA Corporation, was used as the heat-aging-resistant agent. A product name "AO-60", manufactured by ADEKA Corporation, was used as the antioxidant agent. A product name "Q100f", manufactured by Sun Aroma Co, Ltd., was used as a polypropylene resin (PP) as a base resin of Comparative Example 8. Izod impact value (IZOD) and oxygen index of each resin composition of Examples (1 to 3) and Comparative Examples (1 to 8) are shown in Tables 2 and 3.

TABLE 1

|  | PA6 Example 1 | PA66 Example 2 | PA12 Example 3 | PA6 Comparative Example 1 | PA66 Comparative Example 2 | PA6 Comparative Example 3 |
|---|---|---|---|---|---|---|
| PA6 | 50 |  |  | 50 |  |  |
| PA66 |  | 50 |  |  | 50 |  |
| PA12 |  |  | 50 |  |  | 50 |
| PP |  |  |  |  |  |  |
| Elastomer | 20 | 20 | 20 | 20 | 20 | 20 |
| Brominated Flame Retardant | 20 | 20 | 20 | 20 | 20 | 20 |
| Antimony Trioxide | 5 | 5 | 5 | 5 | 5 | 5 |
| Heat-Aging-Resistant Agent | 3 | 3 | 3 | 3 | 3 | 3 |
| Antioxidant | 2 | 2 | 2 | 2 | 2 | 2 |

|  | PA6 Comparative Example 4 | PA6 Comparative Example 5 | PA6 Comparative Example 6 | PA6 Comparative Example 7 | PP Comparative Example 8 |
|---|---|---|---|---|---|
| PA6 | 60 | 40 | 50 | 50 |  |
| PA66 |  |  |  |  |  |

TABLE 1-continued

| | | | | | |
|---|---|---|---|---|---|
| PA12 | | | | | |
| PP | | | | | 50 |
| Elastomer | 10 | 30 | 20 | 10 | 20 |
| Brominated Flame Retardant | 20 | 20 | 10 | 30 | 20 |
| Antimony Trioxide | 5 | 5 | 5 | 5 | 5 |
| Heat-Aging-Resistant Agent | 3 | 3 | 3 | 3 | 3 |
| Antioxidant | 2 | 2 | 2 | 2 | 2 |

(Preparation of Harness Exterior Protecting Member)

Each harness exterior protection member was prepared such that an inner diameter of a tube is 7 mm, each thickness of the bent portion is 0.2 mm, 0.3 mm or 0.45 mm in Examples while being 0.1 mm or 0.7 mm in Comparative Examples, and a thickness of the straight portion is 0.5 mm, 0.6 mm or 1.20 mm in Examples while being 0.3 mm, 1.0 mm or 1.8 mm in Comparative Examples.

(Evaluation)

Evaluation on the bending strength, the flame retardance, the die drool, the short-term heat resistance, and the impact sensitivity of the tube (harness exterior protection member) having the inner diameter of 7 mm was performed using the following methods regarding the above-described resin compositions of Examples and Comparative Examples.

(Strength Evaluation)

With respect to the bending strength, the tube as a test sample was supported by a pair of support members, separated by 100 mm, the center of the test sample was pushed by a distal end of a push rod at 100 mm/min, and a load at which a changing point occurred was measured.

In a confirmation test of a bending radius, one tube with a proper length in which a bundled electric wire of about 80% of the tube inner diameter was inserted was selected as a test sample. A case in which this test sample was allowed to be bent at 180 degree or more in a U shape by a mandrel having a predetermined outer diameter (for example, 200 mm or the like), that is, the case in which there was no whitening and no crack, breakage or scratch causing a trouble on use when being bent was evaluated as "O", and the opposite case was evaluated as "X". Results of the evaluation are shown in Tables 2 and 3. In addition, a condition of requiring a bending radius of the bent portion to satisfy 10 mm or larger, and a bending strength of the straight portion to satisfy 15 to 25 N was set in the case of the tube having an inner diameter of 7 mm.

(Flame Retardance Evaluation)

The evaluation on the flame retardance was performed using a method in which a lower end of a tube of a test sample being vertically held was brought into contact with a flame of a gas burner for 10 seconds, and was brought into contact with the flame for 10 seconds again when combustion stopped within 30 seconds. Any composition, which satisfied a condition that there is no sample continuously combusting for 30 seconds or more after either case of being brought into contact with the flame, or that a total combustion time of 10 times of flame tests with respect to five samples does not exceed 250 seconds, was evaluated as "O", and any composition which did not satisfy the condition was evaluated as "X". Results of the evaluation are shown in Tables 2 and 3.

(Evaluation of Die Drool)

Whether a foreign substance (a lump of resin, that is, so-called die drool) is attached to a product was confirmed by visual observation for a time in which a tube is manufactured by extrusion molding using the resin composition (for 8 hours or more). A case in which the die drool was not generated was evaluated as "O", and a case in which the die drool was generated was evaluated as "X". Results of the evaluation are shown in Tables 2 and 3.

(Short-Term Heat Resistance Evaluation)

In a heat resistance test, one tube with a proper length was selected, held at a temperature of 180° C. for one hour, and then was taken out. A case in which there was no crack, breakage or scratch causing a trouble on use after melting was evaluated as "O", and the opposite case was evaluated as "X". Results of the evaluation are shown in Tables 2 and 3.

(Impact Sensitivity Evaluation)

In an impact resistance test, one tube with a length of about 300 mm in which a bundled electric wire of about 80% of the tube inner diameter was inserted was selected as a test sample. This test sample was cooled at a temperature of −20° C. for 48 hours, and then, a steel ball having a mass of 100 g was dropped on the test sample from a height of 1 mm. A case in which there was no crack, breakage or scratch causing a trouble on use was evaluated as "O", and the opposite case was evaluated as "X". Results of the evaluation are shown in Tables 2 and 3.

TABLE 2

| Resin Composition | Example 1 | | | Comparative Example 1 (Structure) | | |
|---|---|---|---|---|---|---|
| IZOD (kJ/m²) (−40° C. to 23° C.) | | 70 | | | | |
| Oxygen Index (27 or more) | | 27 | | | | |
| Resin | PA66 | PA66 | PA66 | PA66 | PA66 | PA66 |
| Bent Portion Thickness (mm) | 0.2 | 0.3 | 0.45 | 0.1 | 0.7 | 0.7 |
| Straight Portion Thickness (mm) | 0.5 | 0.6 | 1.2 | 0.3 | 1.0 | 1.8 |
| Strength Evaluation | o | o | o | x | o | x |
| Bending Radius | o | o | o | o | x | x |
| Flame Retardance Evaluation | o | o | o | o | o | o |
| Evaluation of Die Drool | o | o | o | o | o | o |
| Short-Term Heat Resistance | o | o | o | o | o | o |
| Impact Sensitivity Evaluation | o | o | o | o | o | o |

| Resin Composition | Example 2 | | | Comparative Example 2 (Structure) | | |
|---|---|---|---|---|---|---|
| IZOD (kJ/m²) (−40° C. to 23° C.) | | 75 | | | | |
| Oxygen Index (27 or more) | | 27 | | | | |
| Resin | PA6 | PA6 | PA6 | PA6 | PA6 | PA6 |
| Bent Portion Thickness (mm) | 0.2 | 0.3 | 0.45 | 0.1 | 0.7 | 0.7 |
| Straight Portion Thickness (mm) | 0.5 | 0.6 | 1.2 | 0.3 | 1 | 1.8 |
| Strength Evaluation | o | o | o | x | o | x |
| Bending Radius | o | o | o | o | x | x |
| Flame Retardance Evaluation | o | o | o | o | o | o |
| Evaluation of Die Drool | o | o | o | o | o | o |
| Short-Term Heat Resistance | o | o | o | o | o | o |

TABLE 2-continued

| Impact Sensitivity Evaluation | ○ | ○ | ○ | ○ | ○ | ○ |
|---|---|---|---|---|---|---|

| Resin Composition | Example 3 | | | Comparative Example 3 (Structure) | | |
|---|---|---|---|---|---|---|
| IZOD (kJ/m²) (−40° C. to 23° C.) | 80 | | | | | |
| Oxygen Index (27 or more) | 27 | | | | | |
| Resin | PA12 | PA12 | PA12 | PA12 | PA12 | PA12 |
| Bent Portion Thickness (mm) | 0.2 | 0.3 | 0.45 | 0.1 | 0.7 | 0.7 |
| Straight Portion Thickness (mm) | 0.5 | 0.6 | 1.2 | 0.3 | 1 | 1.8 |
| Strength Evaluation | ○ | ○ | ○ | x | ○ | x |
| Bending Radius | ○ | ○ | ○ | ○ | x | x |
| Flame Retardance Evaluation | ○ | ○ | ○ | ○ | ○ | ○ |
| Evaluation of Die Drool | ○ | ○ | ○ | ○ | ○ | ○ |
| Short-Term Heat Resistance | ○ | ○ | ○ | ○ | ○ | ○ |
| Impact Sensitivity Evaluation | ○ | ○ | ○ | ○ | ○ | ○ |

TABLE 3

| Resin Composition | Comparative Example 4 (Elastomer reduced in amount) | | | Comparative Example 5 (Elastomer increased in amount) | | |
|---|---|---|---|---|---|---|
| IZOD (kJ/m²) (−40° C. to 23° C.) | 50 | | | 500 | | |
| Oxygen Index (27 or more) | 27 | | | 27 | | |
| Resin | PP66 | PP66 | PP66 | PP66 | PP66 | PP66 |
| Bent Portion Thickness (mm) | 0.2 | 0.3 | 0.45 | 0.2 | 0.3 | 0.45 |
| Straight Portion Thickness (mm) | 0.5 | 0.6 | 1.2 | 0.5 | 0.6 | 1.2 |
| Strength Evaluation | ○ | ○ | ○ | ○ | ○ | ○ |
| Bending Radius | ○ | ○ | ○ | ○ | ○ | ○ |
| Flame Retardance Evaluation | ○ | ○ | ○ | ○ | ○ | ○ |
| Evaluation of Die Drool | ○ | ○ | ○ | x | x | x |
| Short-Term Heat Resistance | ○ | ○ | ○ | x | x | x |
| Impact Sensitivity Evaluation | x | x | x | ○ | ○ | ○ |

| Resin Composition | Comparative Example 6 (Flame Retardant reduced in amount) | | | Comparative Example 7 (Flame Retardant increased in amount) | | |
|---|---|---|---|---|---|---|
| IZOD (kJ/m²) (−40° C. to 23° C.) | 70 | | | 70 | | |
| Oxygen Index (27 or more) | 23 | | | 35 | | |
| Resin | PP66 | PP66 | PP66 | PP66 | PP66 | PP66 |
| Bent Portion Thickness (mm) | 0.2 | 0.3 | 0.45 | 0.2 | 0.3 | 0.45 |
| Straight Portion Thickness (mm) | 0.5 | 0.6 | 1.2 | 0.5 | 0.6 | 1.2 |
| Strength Evaluation | ○ | ○ | ○ | ○ | ○ | ○ |
| Bending Radius | ○ | ○ | ○ | ○ | ○ | ○ |
| Flame Retardance Evaluation | x | x | x | ○ | ○ | ○ |
| Evaluation of Die Drool | ○ | ○ | ○ | x | x | x |
| Short-Term Heat Resistance | ○ | ○ | ○ | ○ | ○ | ○ |
| Impact Sensitivity Evaluation | ○ | ○ | ○ | ○ | ○ | ○ |

| Resin Composition | Comparative Example 8 (PP) | | |
|---|---|---|---|
| IZOD (kJ/m²) (−40° C. to 23° C.) | 70 | | |
| Oxygen Index (27 or more) | 30 | | |
| Resin | PP | PP | PP |
| Bent Portion Thickness (mm) | 0.2 | 0.3 | 0.45 |
| Straight Portion Thickness (mm) | 0.5 | 0.6 | 1.2 |
| Strength Evaluation | ○ | ○ | ○ |
| Bending Radius | ○ | ○ | ○ |
| Flame Retardance Evaluation | ○ | ○ | ○ |
| Evaluation of Die Drool | ○ | ○ | ○ |
| Short-Term Heat Resistance | x | x | x |
| Impact Sensitivity Evaluation | ○ | ○ | ○ |

As shown in Table 2, Examples 1 to 3 within a scope of the present invention showed favorable results in terms of all the bending strength, the flame retardance, the die drool, the short-term heat resistance, and the impact sensitivity. That is, the favorable results in terms of all the bending strength, the flame retardance, the die drool, the short-term heat resistance, and the impact sensitivity are shown in the tubes (harness exterior protection members) each of which is formed by extrusion molding of the flame-retardant polyamide resin composition containing 20 parts by weight of the elastomer, 20 parts by weight of the brominated flame retardant, 5 parts by weight of the antimony trioxide, 3 parts by weight of the heat-aging-resistant agent, and 2 parts by weight of the antioxidant agent with respect to 50 parts by weight of the polyamide resin such that the thickness of the bent portion is 0.2 mm, 0.3 mm or 0.45 mm, the thickness of the straight portion 0.5 mm, 0.6 mm or 1.20 mm.

In contrast, Comparative Examples 1 to 3 were evaluated as having the degraded bending strength because the thickness of the bent portion or the straight portion was too thin or too thick as shown in Table 2. In addition, Comparative Example 4 was evaluated as having the degraded impact sensitivity because the addition amount of polyamide resin was large, and the addition amount of elastomer was small as shown in Table 3. In addition, Comparative Example 5 was evaluated as having the degraded die drool and short-term heat resistance because the addition amount of polyamide resin was small, and the addition amount of elastomer was large. In addition, Comparative Example 6 was evaluated as having the degraded flame retardance because the addition amount of brominated flame retardant was small. Further, Comparative Example 7 was evaluated as having the degraded die drool because the addition amount of brominated flame retardant was large, and the addition amount of elastomer was small. Further, Comparative Example 8 was evaluated as having the degraded short-term heat resistance because the polypropylene resin was added as the base resin.

The present invention has been described with reference to the examples as above, but the present invention is not limited thereto, and various modifications can be made within a scope of a gist of the present invention.

What is claimed is:

1. A harness exterior protection member formed of a flame-retardant polyamide resin composition, the harness exterior protection member comprising:
   a bent portion configured to be a cylindrical shape;
   a straight portion that is formed to be integrated with the bent portion and configured to be a cylindrical shape,
   wherein a thickness of the straight portion is set to be twice or more and four times or less of a thickness of the bent portion,
   a bending radius of the bent portion is 10 mm or larger, and
   a bending strength of the straight portion is 15 N or more and 25 N or less.

2. The harness exterior protection member according to claim 1, wherein
   the bent portion is formed to have a thickness of 0.15 mm or more and 0.45 mm or less, and the straight portion is formed to have a thickness of 0.45 mm or more and 1.20 mm or less.

3. A wire harness comprising:
   a harness exterior protection member according to claim 1; and
   a plurality of linear conductors configured to be inserted into the harness exterior protection member.

4. The harness exterior protection member according to claim 1, wherein the flame-retardant polyamide resin composition is comprised of, by weight, about 50 percent polyamide resin, about 20 percent elastomer, and about 20 percent bromide flame retardant.

5. The harness exterior protection member according to claim 4, wherein the flame-retardant polyamide resin composition is further comprised of about 5 percent antimony trioxide by weight.

6. The harness exterior protection member according to claim 4, wherein the flame-retardant polyamide resin composition is further comprised of about 3 percent heat aging resistant agent by weight.

7. The harness exterior protection member according to claim 4, wherein the flame-retardant polyamide resin composition is further comprised of about 2 percent antioxidant by weight.

\* \* \* \* \*